(No Model.) 2 Sheets—Sheet 2.
J. W. HYATT.
STRAINER FOR GRANULAR FILTER BEDS.
No. 512,298. Patented Jan. 9, 1894.
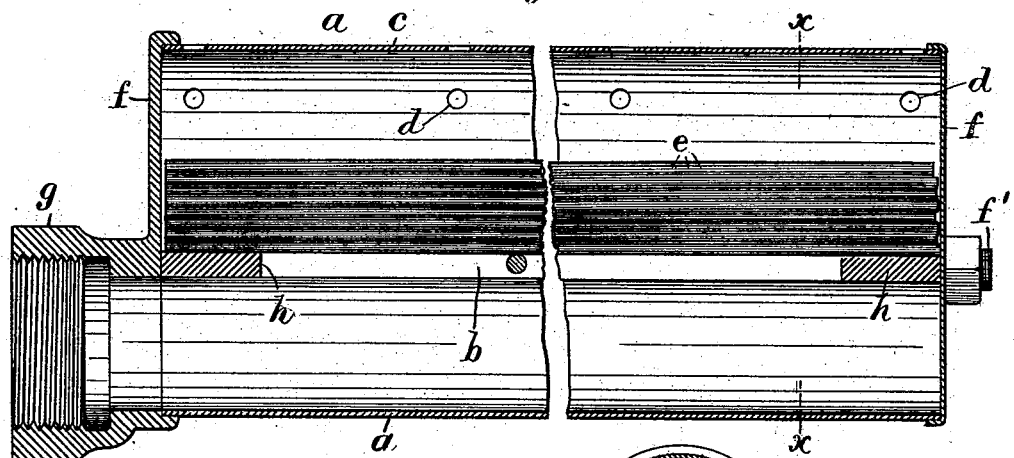
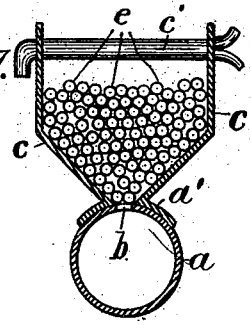
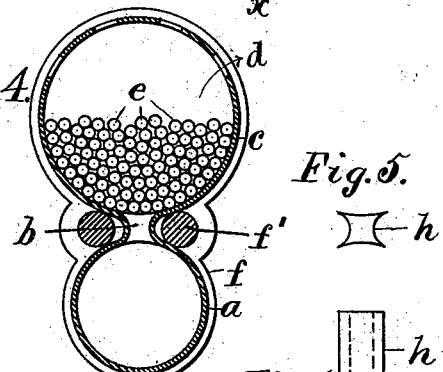
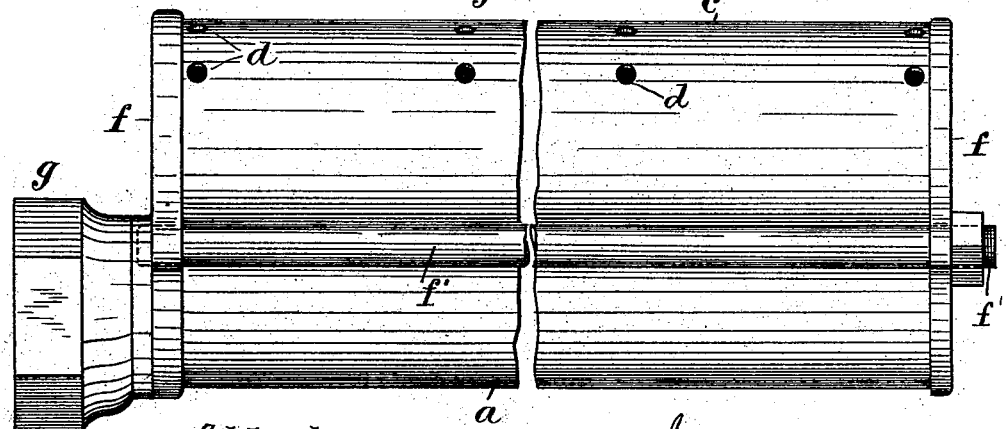

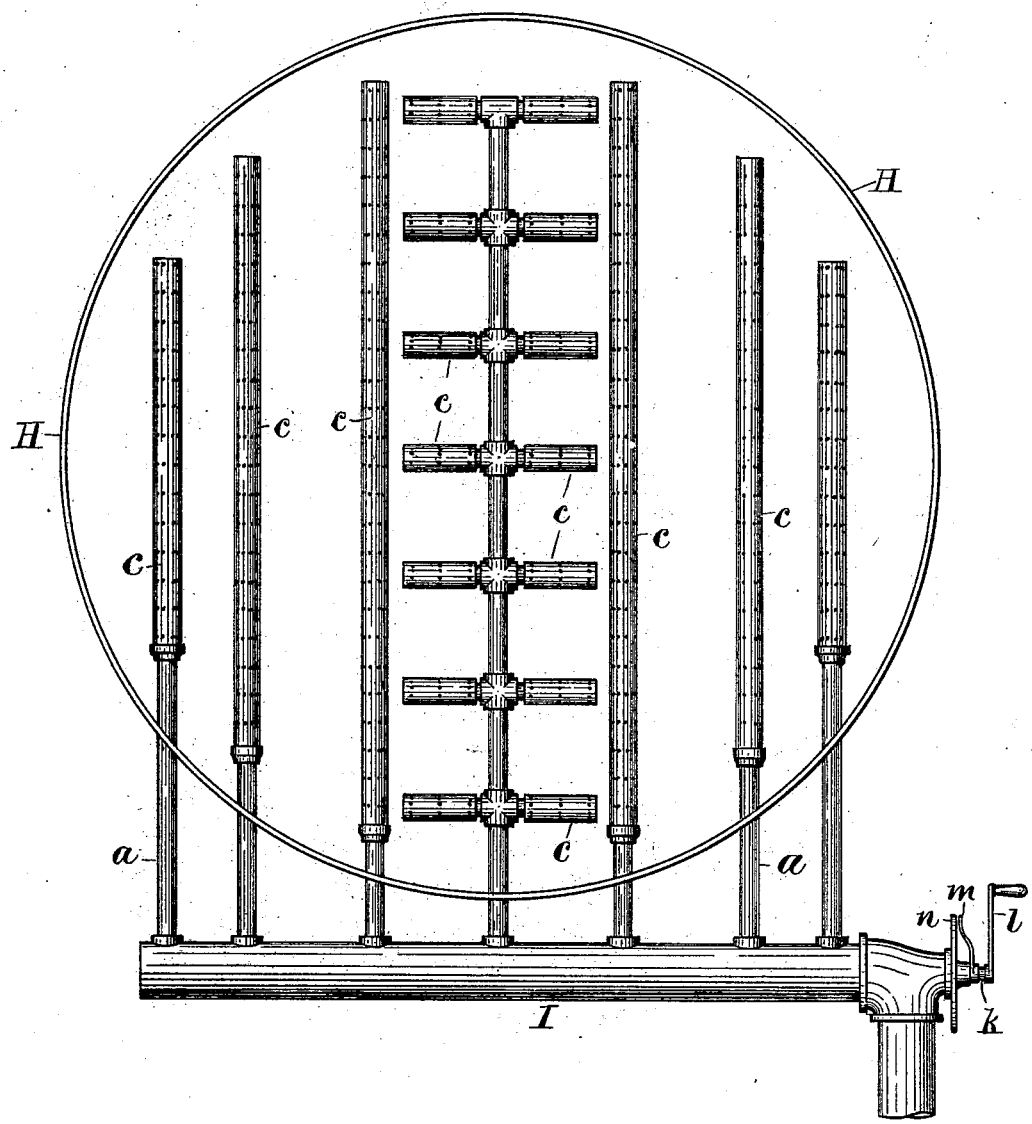

UNITED STATES PATENT OFFICE.

JOHN W. HYATT, OF NEWARK, NEW JERSEY.

STRAINER FOR GRANULAR FILTER-BEDS.

SPECIFICATION forming part of Letters Patent No. 512,298, dated January 9, 1894.

Application filed February 23, 1893. Serial No. 463,311. (No model.)

*To all whom it may concern:*

Be it known that I, JOHN W. HYATT, a citizen of the United States, residing at Newark, Essex county, New Jersey, have invented certain new and useful Improvements in Strainers for Granular Filter-Beds, fully described and represented in the following specification and the accompanying drawings, forming a part of the same.

This invention relates to that class of strainers in which a series of loose rods is employed to protect the outlet apertures from the penetration of sand. Sand is largely used in such granular filter beds, and is liable, if the strainer be defective, to penetrate the pipes with which the strainer is connected. The sand would thus become mingled with the filtered water and foul the same, and it is also liable to clog the pipes in such degree that they become inoperative. In the present invention a series of loose rods is inserted within a longitudinal strainer casing over the water outlet at the bottom. Such strainers are inserted in the bottom of the filter bed, and when the filter bed is operating normally the water current passes downward through the filter bed and escapes through the strainers by percolation between the loose rods, which however, lie so closely together as to intercept any particles of sand. When the current of water is reversed through the strainers to wash the filter bed, the rods offer no obstruction to its free admission, as they are easily displaced by the water current and thus permit it to discharge freely into the bed from the perforated or open casing. As soon as such current ceases the rods settle into the lower part of the casing and there form a barrier to the escape of the sand.

The invention will be understood by reference to the annexed drawings, in which—

Figure 1 is a plan of a filter having a series of strainers located in the bottom and connected with a tubular valve for reversing the current through the strainers in turn, by which the filter bed may be washed in sections. Fig. 2 is a longitudinal section of a filter strainer. Fig. 3 is a side elevation of the same, both views being broken transversely for want of room upon the drawings. Fig. 4 is a cross section of the same on line $x, x,$ in Fig. 2. Figs. 5 and 6 are an end view and plan of the bridges for such strainer; and Fig. 7 is a transverse section of an alternative construction.

The pipes $a$ are, in the normal operation of the filter, used as outlet pipes for the filtered water, and are therefore called outlet pipes herein, although they may be used to introduce water for washing the filter bed. I have shown the strainers arranged for thus washing the filter bed in sections. Each strainer is extended longitudinally along the top of one of these pipes, and may be made of any desired length, with the rods extended the whole length of the same. The pipe is formed in the top with a slot $b$, or other outlet, by which it is connected with the bottom of the strainer. The strainer casing $c$ may be open upon the upper side as in Fig. 7; or perforated with holes $d$ as in Fig. 4, to guide the washing water into a suitable direction when discharged into the material of the bed. Heads $f$ are fitted to the ends of the casing and secured thereto by tie-rods $f'$, and the rods $e$ are made a little shorter than the space between the heads $f$, so as to move freely within the casing, and are prevented from falling through the slot by bridges $h$ at the ends of the same, and at intermediate points if desired. The bridges also perform the function of preventing the sand which penetrates between the ends of the rods and the casing from entering the slot, as the rods lying upon the bridges prevent such movement in practice quite effectively.

The casing $c$ is shown in Fig. 7 formed separate from the pipe $a$ and attached thereto by flanges $a'$, and is shown with straight sloping sides and open top; with cross bars $c'$ inserted across the top of the casing a little above the rods to prevent them from dislodgment. With this construction the sand of the filter bed rests directly upon the rods, and is prevented from entering the pipes $a$, although the water escapes freely through the minute interstices between the rods. The casing is, however, of greater strength when made cylindrical as shown in Fig. 4, and may be readily made of sheet metal, of such form, in a single piece with the pipe $a$; by pressing in the sides of a seamless brass tube by suitable tools.

The caps $f$ are shown in Fig. 2 flanged over the ends of the pipe and casing, to which they would be secured by bolts, but such strainers may be formed of any other construction, adapted to furnish one or more slots in the bottom, and a receptacle with sloping sides above the slot or slots to hold the loose rods upon the same.

The construction shown in Figs. 4 and 7 furnish sloping sides to hold the rods in the desired relation to the outlet aperture $b$. Such arrangement necessitates the passage of the water through the rods when flowing from the filter, and when the current is reversed to wash the filter bed it permits the washing water to displace the rods and thus enter freely.

Fig. 1 illustrates a variety of arrangements for such strainers, and others may be devised to suit the forms of other filters. In the illustration, a circular filter casing H is shown, with a header I outside the casing furnishing washing water, through branch pipes $a$, to a series of strainers within the casing. The center branch within the casing is provided with fourteen short strainers attached at right angles to the same. The branches at the two ends of the header are connected with lateral strainers, and the intermediate branches are connected with strainers extended directly across the bottom of the casing. To direct the water into such strainers successively, the header may be furnished with a tubular valve having a rotary or sliding movement, as claimed in my Patent No. 402,738, issued May 7, 1889. For such purpose the header would be provided at the end with a spindle $k$ having a crank $l$ to turn the same, and an index $m$ and dial $n$ to determine the various positions of the interior sleeve, to wash the various sections of the bed in turn.

A very cheap and light strainer may be produced by the above construction, and brass may therefore be employed, which is more durable and reliable than iron, on account of its non-corrosive character.

The strainer described herein is in practice very efficient in preventing the escape of sand from the filter bed, and where the current is reversed in the filter bed it also permits the washing water to enter the bed freely, so as to disintegrate its substance in the most effective manner.

By the use of suitable tools the strainer casing may be made very cheaply, and the rods consist merely in pieces of straightened wire, which may vary from No. 16 to No. 12 wire gage in thickness, in proportion to the grade of sand in the bed.

A series of round holes or any other form of aperture may be used in place of a longitudinal slot in the bottom of the strainer casing; but I have made specific claim herein to the slot as it affords the water a much freer discharge from the outlet pipe and thus operates to wash the bed more effectively. I have also claimed the duplex tube formed in one piece of sheet metal (which is shown in Fig. 4) as it furnishes a cheap and effective construction.

My construction performs two distinct functions, namely, the straining of the sand from the outflowing water, and the free admission of the water when the current is reversed, and it will therefore be understood that the strainers may be used in filters which contain a granular filter bed, but are cleansed without reversing the current through the strainers.

I do not make any generic claim herein to the use of a series of loose rods as a straining instrumentality, but have claimed the same in another application, Serial No. 481,807, dated July 29, 1893, for an improvement in filter strainers.

Having thus set forth my invention, what I claim herein is—

1. In a strainer for filters, the combination, with a strainer casing perforated about the top, and having a water inlet in the bottom, of a series of loose rods resting over such water inlet, substantially as set forth.

2. In a strainer for filters, the combination, with a strainer casing perforated about the top and having a longitudinal slot in the bottom, of one or more bridges extending across the slot, and a series of loose rods supported by such bridges, substantially as set forth.

3. In a strainer for filters, the combination, with an outlet pipe having outlets in the top, of a strainer casing applied to such slot and formed with sloping sides, caps upon the ends of the casing and a series of loose rods supported by such sloping sides, as set forth.

4. A strainer for filters having an outlet pipe and strainer casing formed of one piece of sheet metal bent into a duplex tube, with a slot at the junction of the tubes, bridges secured in such slot, and a series of loose rods resting within the casing, substantially as set forth.

In testimony whereof I have hereunto set my hand in the presence of two subscribing witnesses.

JOHN W. HYATT.

Witnesses:
CHARLES S. LOCKWOOD,
THOMAS S. CRANE.